United States Patent [19]

Chriss

[11] Patent Number: 5,346,934
[45] Date of Patent: Sep. 13, 1994

[54] FOOTWEAR ADDITIVE MADE FROM RECYCLED MATERIALS

[76] Inventor: Henry T. Chriss, 3280 SW. 170th, #1008, Beaverton, Oreg. 97005

[21] Appl. No.: 994,591

[22] Filed: Dec. 21, 1992

[51] Int. Cl.⁵ .................. C08L 89/06; B32B 9/02
[52] U.S. Cl. ........................ 524/11; 524/17; 524/18; 524/35; 428/318.8
[58] Field of Search .................. 524/11, 17

[56] References Cited

U.S. PATENT DOCUMENTS

| | | | |
|---|---|---|---|
| 1,344,504 | 6/1920 | Grosjean | 36/32 A |
| 1,687,441 | 10/1928 | Grosjean | 428/54 |
| 1,995,179 | 3/1935 | Holm | 524/11 |
| 2,039,529 | 5/1936 | Guinzburg | 524/34 |
| 2,041,223 | 5/1936 | Bollman | 524/8 |
| 2,638,457 | 5/1953 | Gates | 524/35 |
| 2,643,234 | 6/1953 | Backus | 524/11 |
| 2,822,627 | 2/1958 | Sieberling | 521/148 |
| 2,845,640 | 8/1958 | Murray | 427/243 |
| 3,542,705 | 11/1970 | Mason et al. | 524/11 |
| 3,582,508 | 6/1971 | McIntosh, Jr. | 525/123 |
| 3,607,609 | 9/1971 | Bogdanovicz | 524/17 |
| 3,663,472 | 5/1972 | Raymond | 524/11 |
| 4,162,996 | 7/1979 | Parrini et al. | 524/11 |
| 4,287,252 | 9/1981 | Dimiter | 524/11 |
| 4,405,730 | 9/1983 | Cohen | 524/35 |
| 4,515,852 | 5/1985 | Katabe et al. | 524/507 |
| 4,552,909 | 11/1985 | Czerwinski et al. | 524/11 |
| 4,649,586 | 3/1987 | Wu | 428/235 |
| 4,775,558 | 10/1988 | Haas et al. | 524/11 |
| 4,834,762 | 5/1989 | Nishibori | 524/11 |
| 4,866,116 | 9/1989 | Ek et al. | 524/430 |
| 5,134,178 | 7/1992 | Nishibori | 524/11 |

FOREIGN PATENT DOCUMENTS

| | | | |
|---|---|---|---|
| 3152699 | 6/1988 | Japan | 524/11 |
| 1163215 | 6/1989 | Japan | 524/11 |
| 403162500 | 7/1991 | Japan | 524/11 |
| 9000184 | 1/1990 | PCT Int'l Appl. | 524/11 |

*Primary Examiner*—Paul R. Michl
*Assistant Examiner*—Olga Asinovsky
*Attorney, Agent, or Firm*—Banner, Birch, McKie & Beckett

[57] ABSTRACT

The invention relates to footwear additives made using recycled materials. In particular, the invention relates to an additive used in the formation of an article of footwear where the additive comprises finely divided recycled footwear materials. The recycled footwear materials may be scraps generated during the manufacture of the article of footwear, or defective or used articles of footwear. The additive materials can be selected from the group consisting of leather, cotton, thermoplastics, synthetic and natural rubber, millable/partially cross-linked polyurethane, and synthetic fibers. The thermoplastics include polyamides, polyesters and polyurethanes.

7 Claims, No Drawings

FOOTWEAR ADDITIVE MADE FROM RECYCLED MATERIALS

FIELD OF THE INVENTION

This invention relates to footwear additives comprising recycled materials. In particular, the invention relates to an additive used in the formation of an article of footwear where the additive comprises recycled footwear materials which have been ground to a desired particle size. The recycled footwear materials are selected from the group consisting of scraps, shavings and excess materials generated during the manufacture of athletic footwear, defective articles of footwear, used articles of footwear and combinations thereof. The recycled footwear materials may contain various materials such as leather, synthetic and natural fibers, synthetic and natural rubber, thermoplastics and thermosetting or otherwise cured plastics. The recycled materials are ground to an effective particle size and then added to raw footwear material during compounding or secondary mixing, i.e. the recycled materials are mixed in after the base compound has been mixed.

BACKGROUND OF THE INVENTION

Various materials are required in the manufacture of an article of footwear. The midsoles and outsoles of an article of athletic footwear typically comprise a combination of synthetic and natural rubber, thermoplastics and thermosetting or otherwise cured plastics, and leather materials. The uppers of an article of footwear typically comprise leather, natural fibers (e.g. cotton), synthetic fibers (e.g. polyester) and the like. During the manufacture of an article of footwear, these materials are cut into a desired shape to fit a particular pattern or design. As a result of the cutting process, portions of these materials are discarded as scrap thereby increasing the cost of manufacture and indirectly harming the environment by competing for available landfill space. Also, defective and used articles of footwear currently are discarded further increasing the manufacturing costs and further burdening available landfill space.

It has been known to use discarded tire material in shoe outsoles. U.S. Pat. No. 1,687,441 to Grosjean uses waste from tire making where the waste tire material comprises cords made from cords or fabric material covered by a thin coating of uncured rubber. The cords typically are processed so that they are maintained intact while being orientated and aligned in such a fashion to impart strength to the outsole. U.S. Pat. No. 2,822,627 to Seiberling prepares blown fiber-containing shoe soles from scrap tire cord (preferably coated with uncured rubber), overshoes and hoses. The fibers in the rubber sources are aligned in the general direction in which the stock is passed through a cracker mill with corrugated rollers and then run it through a chopper with parallel blades and cut to the desired length (less than about 2 inches). U.S. Pat. No. 2,041,223 to Bollman utilizes finely divided vulcanized rubber, such as finely ground truck tires as a filler in a rubber/solvent composition. The composition hardens as the solvent evaporates and is useful in the repair of shoe soles.

U.S. Pat. No. 2,643,234 to Backus discloses a non-skid crepe rubber composition containing finely divided neoprene dissolved in a suitable solvent and to which is added ground rubber (less than 8 mesh screen size). The ground rubber source may be vulcanized or unvulcanized natural rubber, synthetic rubbers and rubber scraps. The composition may also contain fibrous fillers such as cotton fibers, leather fibers, cellulose flock and synthetic yarn fibers. The fibers may be micropulverized.

It also has been known to employ fibrous materials such as cellulosic flock including silk, cotton and rayon flock materials as well as wool in the manufacture of vulcanized rubber materials to impart various characteristics to the rubber such as toughness. See U.S. Pat. Nos. 2,039,529 to Guinzburg (sheet-form rubber products containing animal or vegetable flock, such as silk or cotton, respectively, which has been reduced to a very fine, powdery condition); 2,638,457 to Gates (shoe sole composition containing cellulosic flock, e.g. cotton and rayon); 4,405,730 to Cohen (shoe sole composition comprised of polyvinyl chloride and cellulosic flock having a fiber length of from about 30 to about 300 microns).

It also has been known to employ ground or pulverized leather in the manufacture of vulcanized rubber materials to impart various characteristics to the rubber such as leather-like properties and toughness. See U.S. Pat. Nos. 1,995,179 to Holm (artificial leather from milled rubber and leather with cotton linters used for e.g. shoe soles); 4,162,996 to Panini et al. (leather-like material comprising a fiber mixture of leather fibers, synthetic polymer fibrils and cellulose fibers and a polymeric organic binder; useful for insoles and shoe supports) and 4,834,762 to Nishibori (composition useful as a sheet material containing pulverized leather mixed with a synthetic resin).

U.S. 4,866,116 to Ek et al. discloses a composition for coating, filling, binding and protection which contains rubber with a particle size of at most about 4 mm mixed with an isocyannate curable polyurethane and an aliphatic polyether glycol. The sources of rubber include waste rubber and waste rubber fires.

The methods employed in the prior art which utilize scrap materials as fillers or reinforcing matetiffs are considerably limited in use of specific filler or reinforcing materials in various amounts, and in the use of complex procedures to effect the combination of materials. In some cases, any costs which may be saved in use of scrap materials is lost in the use of additional machinery used to align the tire cord materials and other means used to effect their addition. Moreover, only specific additives can be added to the materials used to manufacture the articles of footwear, particularly athletic footwear. Furthermore, the scrap materials of the prior art were used as a filler material with varying effects, but which typically imparted little or no advantageous effects, and were utilized primarily because they also imparted minimal adverse affects and decreased costs. Thus, there exists a need whereby costs and impact on the environment can be minimized by recycling scrap materials generated during the manufacture of footwear as an additive which imparts various improved characteristics to various raw materials used in the manufacture of an article of footwear.

SUMMARY OF THE INVENTION

The present invention is directed to the use of ground material of articles of footwear, i.e., leather, cotton, synthetics, plastic, polyester, polyurethane, rubber (natural and synthetic) and other materials used in the manufacture of articles of footwear as an additive. Specifically, the present invention is directed to the use of ground recycled material as an additive in the formation of an outsole or midsole for athletic footwear. In a particular embodiment, the recycled materials are ground under ambient conditions to a homogeneous mix with a particle size of less than about 800 μm, and added to partially crosslinked or millable polyurethane, synthetic and natural rubbers for use in the manufacture of outsoles in an article of athletic footwear.

In accordance with the present invention, the addition of the recycled material improves certain properties of raw materials used in the manufacture of an article of footwear, which properties include the wet/dry coefficient of friction, tear resistance, abrasion resistance and anti-skid properties without adversely affecting surface smoothness of the article or flow characteristics during manufacture. The present invention therefore provides a significant economic advantage in that raw material costs can be reduced by addition of scrap recycled material. Furthermore, scrap materials generated during the manufacture of an article of footwear as well as used or defective articles of footwear no longer need to be discarded to the environment. Thus, the recycling of all or a major portion of such solid waste materials minimizes or eliminates a threat to the environment at least in regard to burdening available landfill space.

The recycled matetiffs typically are ground and/or pulverized in a conventional grinding/pulverizing apparatus to achieve a desired particle size. The recycled material then is added to the raw material during the compounding stage or during a secondary mixing stage in an mount of up to about 20% by weight of the total weight of the composition. The composition comprising the recycled material additive then typically is processed using conventional methods such as compression, injection molding, transfer molding and the like.

DETAILED DESCRIPTION OF THE INVENTION

The present invention is based on the discovery that recycled materials comprising scraps generated during the manufacture of an article of footwear or from defective or used articles of footwear can be employed as an additive which imparts improved characteristics to raw materials useful in the manufacture of an article of footwear. Specifically, the recycled materials can be selected from the group consisting of leather, synthetic and natural rubber, synthetic and natural fibers, thermoplastics and thermosetting or otherwise cured plastics. Examples of synthetic and natural rubbers include, but are not limited to, styrene—butadiene copolymers, polybutadiene, and Malaysian natural rubber. Examples of thermoplastics include, but are not limited to, polyester elastomer, thermoplastic polyurethane, polyamides (e.g. nylons), ethylene vinyl acetate and polyethylene. Examples of thermosetting or otherwise cured plastics include, but are not limited to, millable polyurethanes (peroxide curable thermoplastic polyurethanes). Synthetic and natural fibers include, but are not limited to, polyester fibers, nylon fibers and cotton fibers. The scrap, defective or used materials are finely divided by conventional means, for example, by grinding or milling into a homogeneous mixture, preferably having an average particle size of less than about 800 μm. The recycled materials then are added to millable/partially crosslinked polyurethane, thermoplastics or rubber (synthetic or natural) for use in the manufacture of an outsole or midsole for an article of footwear. Thermoplastics (i.e. melt processible plastics) are plastics processed by heating past their glass transition temperatures in order to mold into specific geometries and then cooled below the glass transition temperatures to maintain these specific geometries.

The recycled material can be any scrap material generated during the manufacture of an article of footwear, and can be discarded, defective or used articles of footwear. When added to raw materials useful in the manufacture of articles of footwear, the recycled material improves various properties of the composition. The recycled material typically contains materials selected from the group consisting of leather, chemically blown-/foamed polyester, polyurethane, millable/partially crosslinked polyurethane, synthetic and natural rubber, synthetic fibers, cotton and thermoplastics. Preferably, the recycled material is selected from one or more of the aforementioned materials. More preferably, the recycled material is selected from four or more of the aforementioned materials to achieve a synergistic effect in improving desired, aforementioned properties of the composition.

The recycled material typically is ground and/or pulverized, for example, at conditions in a conventional grinding and pulverizing apparatus to achieve the desired particle size. Example of conventional grinding apparatus include chamber-type high speed shredders and knife/blade shredders. An example of a conventional pulverizer is a high speed disc-type size reducer. The desired particle size varies depending on the raw material to which the recycled material is added. For example, if the recycled material is added to synthetic or natural rubber, the particle size of the recycled material is preferably within the range of from about 450 to about 500 μm. If the recycled material is added to polyester polyurethane, the particle size of the recycled material is preferably within the range of from about 450 to about 500 μm.

Preferably, the recycled material is ground to a homogeneous mix having an average particle size less than about 800 μm. The term "homogeneous mix" used throughout the specification and claims is meant to include a mixture of material wherein the particle size of individual particles does not deviate from the average particle size by more than 15–20%. More preferably, the average particle size of the homogeneous mix of recycled material is less than about 700 μm, and yet more preferably less than about 600 μm. The average particle size of the homogeneous mix of recycled material most preferably is within the range of from about 450 to about 550 μm. An average particle size of 500 μm is optimal. Average particle sizes greater than about 800 μm causes surface roughness, bond and cosmetic problems and smaller than 450 μm does not have any adverse effect.

The actual chemical make-up of the recycled material is unknown because the recycled material is, in essence, finely divided, e.g. ground up, old shoes and scrap rubber, foam, plastic and fibrous materials. In the following description of the amounts of materials present in the recycled material, the percentages by weight (wt %) are based on the total weight of the recycled material. The recycled material may comprise anywhere from about 65 to about 80 natural and synthetic rubber. Preferably, the recycled material comprises from about 70 to about 80 wt %, natural and synthetic rubber. The recycled material also may comprise anywhere from about 2 to about 5 wt %, preferably from about 2 to about 3 wt %, chemically ($H_2O$) blown polyester-based polyurethane foam. The mount of millable/partially crosslinked polyurethane in the recycled composition of the present invention may be anywhere from 0 to about 2 wt %, preferably from about 1 to about 2 wt %. The recycled material also may comprise anywhere from 0 to about 0.5 wt % thermoplastic material. Preferably, the recycled material comprises from about 0.2 to about 0.5 wt %, thermoplastic material. These amounts are determined by type of shoes and excess shoe material recycled.

The amount of natural or synthetic leather in the recycled composition of the present invention may be anywhere from about 1 to about 2.5 wt %, preferably from about 1 to about 2 wt %. Synthetic leather is the most commonly used. The amount of cotton in the recycled material of the present invention can be from 0 to about I wt %. Preferably, cotton is present in an amount of 0 to about 0.5 wt %, and more preferably from about 0.2 to about 0.5 wt %. The amount of synthetic fiber present in the recycled material of the present recycled material typically ranges anywhere from about 5 to about 15 wt %. Preferably, the recycled material comprises about 10 to about 12 wt %, and more preferably about 10 wt %, synthetic fiber. The total fibrous materials content, such as cotton, natural and synthetic leather, and synthetic fibers preferably ranges from about 10 to about 15 %.

The amount of recycled material added to the raw material useful in the manufacture of an article of footwear varies depending on the footwear being recycled. For example, a high top basketball shoe may have about 5 % by weight more synthetic leather than a similar mid-top model. Accordingly, as between a pair of different models of shoe, there is a variance of an estimated 5 to 8 % by weight in the quantity of the major materials making up the shoes. As such, the recycled material is added to the specific raw material(s) or compound(s) in an mount which does not adversely affect the surface smoothness or the flow characteristics of the overall composition relative to that of the raw material(s) or compound(s), and which maintains and preferably enhances the physical and dynamic characteristics of the composition. The recycled material is added to the raw material in an amount of less than about 40 wt % based on the total weight of the composition. Preferably, the recycled material is added in an amount within the range of about 10 wt % to about 25 wt %. More preferably, the recycled material is added to the raw material in an amount within the range of about 10-20 wt %. Even more preferred is an amount of recycle material within the range of about 10-15 wt %.

The materials to which the recycled material is added include any material useful in the manufacture of midsoles and outsoles of an article of athletic footwear. Typically, these materials are selected from the same group as the recycled materials. Preferably, the materials to which the recycled material is added are selected from the group consisting of natural and synthetic rubber, thermoplastics and thermosetable or otherwise curable plastics. More preferably, the materials to which the recycled material is added are selected from the group consisting of natural and synthetic rubber and millable/partially crosslinked polyurethane, a thermosetting plastic.

Specific properties enhanced or improved through addition of the recycled materials of the present invention include, but are not limited to, the coefficient of friction on various surfaces, tear resistance, abrasion resistance and tensile strength. Other properties such as surface smoothness, hardness, modulus, specific gravity and the flow characteristics of the material to which the recycled material is added are not significantly adversely affected by addition of the recycled material of the present invention. While not intending to be bound to any theory, it is believed that the recycled material exhibits these effects for the following reasons. The coefficient of friction is enhanced in millable polyurethane outsoles due to the presence of natural rubber particles and synthetic rubber particles. Abrasion resistance is enhanced in natural and synthetic rubber outsoles due to the presence of millable polyurethane particles and the fibers from the previously mentioned fibrous materials. Tear strength is enhanced due to the fibers also.

In an embodiment of the present invention, scraps generated during the manufacture of articles of footwear and defective, discarded and/or used articles of athletic footwear are ground in a high speed ambient grinding apparatus to achieve a desired particle size. An air separator typically is employed to control the amount of fluff included in the final homogenous mix. The air separator serves to blow off the lighter fiber-like material, known as fluff, in the recycled composition while the heavier materials in the recycled composition settle to the bottom of the air separator which provides a homogeneous mixture of materials. The amount of fluff present in the resultant homogeneous mix typically is less than about 25 wt % of the total weight of the homogeneous mix. Preferably, the amount of fluff is less than about 15 wt %, and more preferably less than about 10 wt % of the total weight of the homogeneous mix although in some formulations, a 10–20% fluff content can be optimal. Too much fluff in the recycle additive adversely affects resistance to tear and elongation when used with polyurethane and rubber compounds in athletic shoe outsoles and midsoles according to the present invention.

The homogeneous mix typically is multicolored because of the various materials included in the homogeneous mix. The homogeneous mix of recycled material then is added to a raw material and/or compound useful in the manufacture of outsoles and/or midsoles of an article of athletic footwear in an amount of up to about 20% by weight of the total weight of the resulting composition. Preferably, the homogeneous mix of recycled material is added to the raw material(s) and/or compound(s) useful in the manufacture of an article of athletic footwear in an amount of up to about 15 wt %, and more preferably in an mount of up to about 10 wt %, of the total weight of the resulting composition.

The homogeneous mix of recycled material is added during the primary compounding stage or during a secondary mixing stage of the raw material useful in the manufacture of outsoles and/or midsoles of an article of athletic footwear. The manner of addition depends primarily on the scorch characteristics and the heat history of the material to which the homogeneous mix of recycled material is added. For example, if the homogeneous mix is added to a natural and/or synthetic rubber composition, it typically is added during a secondary mix when the cure package is added. It is only added on the secondary mix when hard to process materials or compounds gather too much heat history and must be cooled before the cure package is added. The recycled material can be added during one stage mixing on easy to process compounds. In this case it is preferably added last before the cure package is added. Further, skilled practitioners are capable of determining when to add the homogeneous mix of recycled material to a particular raw material used in the manufacture of an article of athletic footwear.

Upon mixing the homogeneous mix of recycled material, the resulting composition then is processed in accordance with conventional article of footwear processing techniques. For example, if the homogeneous mix of recycled material is added to natural rubber, synthetic rubber or millable polyurethane, the resulting rubber composition is compressed and vulcanized to the desired shape. If the homogeneous mix of recycled material is added to an injection-moldable compound, the resulting plastic composition can be subjected to injection molding, compression molding or transfer molding and the like.

The following examples will help illustrate preferred embodiments of the present invention but are in no way meant to limit the scope of the present invention.

EXAMPLES

Example 1

A control solid rubber composition was formulated having the composition listed in Table 1. The ingredients were mixed in a Banbury mixer (an internal mixer) of 80° C., wherein 80° C. is drop temperature, i.e., the temperature at which the material is taken out of the mixer. The ingredients then were vulcanized in a rubber press at 160° C. and vulcanized (i.e., cured, crosslinked or cooked) for 6 minutes. The resulting solid rubber material was labelled C0.

TABLE 1

| Ingredient | Amount (grams) |
| --- | --- |
| Natural Rubber (SMR-10) (Standard Malaysian Rubber-10) | 40.00 |
| Polybutadiene | 60.00 |
| Strucktol 60 NS (Aliphatic-naphthenic-aromatic Resin) | 3.00 |
| Zinc Oxide | 4.00 |
| Carbon Black (ISAF) | 65.00 |
| Paraffinic-Naphthenic Oil | 10.00 |
| Strucktol WB 212 (Fatty Acid Ester) | 1.50 |
| Microcrystalline Wax | 1.00 |
| 1,2-Dihydro-2,2,4-Trimethyl Quinoline | 2.00 |
| Stearic Acid | 1.50 |
| Sulphur | 1.50 |
| MBTS (Methylbutyl Thiurium Monosulfide) | 1.30 |
| TMTM (Tetra-methyl Thiurium Monosulfide) | .10 |
| TOTAL | 190.90 |

Example 2 SOLID ELASTOMER

Defective athletic shoes, which constituted customer returns/complaints due to loose stitching, poor bonds, etc., were ground in a Cumberland Model 584 Granulator (available from Cumberland Engineering Division, John Brown, Inc., So. Attleboro, Mass.) and then pulverized on a Pallmann Disc type closed-loop pulverizer [available from Pallman Pulverizers, Clifton, N.J.]to achieve an average particle size of about 500 μm. The particle size distribution was estimated at about ±15 %. The resulting material was fed to an elutriator based on air and gravity, with a through put of 1200 lbs/hr., thereby driving off the lighter fibrous fluff material and permitting the heavier fines to settle to the bottom. Approximately 18.7 grams (about 10% wt) of the homogeneous mix which settled in the air separator were added to the composition of control C0 shown in Table 1 for a total of about 205 grams during the mixing stage and vulcanized in accordance with the procedure set forth in Example 1. The modified rubber material was labelled C 1.

A sample slab 15 cm×15 cm×2 mm of both C0 and C1 were prepared and test samples of appropriate size were die cut therefrom and subjected to conventional tests to determine the tensile strength, hardness, modulus at 300% elongation, tear resistance, elongation, specific gravity and abrasion resistance. The tensile strength, modulus at 300% elongation and elongation were measured in accordance with ASTM D-412. The hardness was measured in accordance with ASTM D-2240, and the specific gravity was measured in accordance with ASTM D-297. For the tensile strength, tear resistance, elongation and modulus tests, an Instron Model 1122 apparatus available from Instron Corp., Canton, Mass. was used with a crosshead speed of 500 ram/minute. Hardness was tested using a Shore "A" Durometer Model 70300XA available from Shore Instrument Co., Freeport, N.Y. The abrasion resistance was measured using an Akron Abrader Model AB202 available from Ueshima Seisakusho Co., Tokyo, Japan.

Cylindrical samples weighing approximately 2724 grams each of samples having the same composition as C0 and C1, respectively, and produced in the same manner were placed on the support arm of the Akron Abrader and the square load strand counterbalance placed about 1.0 cm from the end of the support arm. The samples each were subjected to about 300 break-in revolutions, and the sample was reweighed. The Akron Abrader wheel rotated at about 35±2 revolutions per minute, had a wheel grit of #40, and was placed at a spindle angle of about 150° relative to the sample. The hardness of the rubber core used was 75±3 Shore A, and the diameter of the standard (rubber core) and the cylindrical samples was about 62±0.5 min. After break-in and reweighing, the samples were each subjected to about 3,000 cycles, and the samples were reweighed. The difference in the weights of the samples then were used to determine the volume of material lost. A lower value thereby represents an object which had a greater abrasion resistance when compared to a higher value. The specific gravity was calculated by dividing the weight of the sample in air by the weight of the sample in air minus the weight of the sample suspended in distilled water at room temperature.

The values obtained from the above tests are presented in Table 2 along with industry standard values for carbon black filled solid rubber materials.

TABLE 2

| TEST | C0 | C1 | Standard |
| --- | --- | --- | --- |
| Hardness (Shore A) | 69 | 61 | 62–68 |
| 300% Modulus (kg/cm$^2$) | 53 | 60 | 90 |
| Tensile strength (kg/cm$^2$) | 135 | 158 | 150 |
| Elongation (%) | 480 | 540 | 400 |
| Tear Resistance (kg/cm) | 48 | 53 | 40 |
| Specific Gravity (g/cm$^3$) | 1.09 | 1.14 | 1.12–1.14 |
| Abrasion Loss (cm$^3$) | 0.22 | 0.103 | 0.20 |

As can be seen from the above table, sample C1 which was modified with the recycled material in accordance with the present invention exhibited superior results in tensile strength, tear resistance and abrasion resistance. The modified sample also exhibited similar results in the other tested characteristics, all of which fall within industry standards for carbon black filled solid rubber materials as well as standards for solid rubber filled with silicas or other conventional fillers.

Example 3

Three samples of solid rubber, one white, one red and one black, were prepared in accordance with the method of Example 1, and the ingredients of each sample are listed in Table 3 below. The white sample was labelled C3, the red sample was labelled C4 and the black sample labelled C5. The mount of homogeneous mix of recycled material (same as in Example 2) was varied from about 10 wt % and 20 wt % based on the total weight of the composition. If 10 wt % recycled material was added, the material was labelled with a 50. If 20 wt % of the recycled material was added, the material was labelled with a 100. Also, the average particle size of the recycled mix was varied. If the particle size was greater than 500/μm the sample was labelled with an "A", and if the particle size was less than or equal to 500/μm, the material was labelled with a "B". The various rubber materials prepared are shown in Table 4 with their respective particle sizes and amounts of homogeneous recycled mix. In regards to Table 3, typical order of materials was: (1) Natural Rubber and Butadiene Rubber; (2) Zinc Oxide and Precipitated Silica; (3) Stearic Acid, BHT, SUN-D, WB-212, SI-69 (a silane; a coupling agent); and (4) Sulfur, 1-MBT (an accelerator), 2,2'-Benzo (an accelerator), Tetramethyl Thiuram. C3, C4 and C5 were similarly prepared with respect to the order of materials addition. However, the order of addition does not make a difference with respect to resulting properties. Only a change in the ingredients or quantifies thereof will significantly change the properties of the resulting composition.

TABLE 3

| SAMPLE INGREDIENTS: | C3 (WHITE) | C4 (RED) | C5 (BLACK) |
|---|---|---|---|
| Natural Rubber (SMR-10) | — | 35.0 | 40.0 |
| Natural Rubber (SMR-2) | 35.0 | — | — |
| Polybutadiene (BR01) | 65.0 | 50.0 | 60.0 |
| Styrene-Butadiene Rubber (SBR-1502) | — | 15.0 | — |
| Naphthenic Resin[E] | — | 3.0 | 3.0 |
| Zinc Oxide | 5.0 | 5.0 | 4.0 |
| Carbon black (ISAF 220 Black) | — | 2.0 | 65.0 |
| Paraffinic-Naphthenic Oil | 10.0 | — | 10.0 |
| Fatty Acid Ester Filler[A] | 1.0 | 1.5 | 1.5 |
| Microcrystalline Wax | 1.0 | 1.0 | 1.0 |
| Stearic Acid | 1.5 | 1.5 | 1.5 |
| Sulfur | 1.8 | 2.0 | 1.5 |
| TMTD | 0.13 | — | 0.1 |
| BTD[C] | 1.3 | 0.6 | 1.3 |
| Trimethylamino-line[D] | — | 1.0 | 2.0 |
| Precipitated Silica (Zeosil)[F] | 40.0 | — | — |
| Silica (VN3 Silica)[G] | — | 45.0 | — |
| 1-Mercaptobenzo thiazole | 0.2 | — | — |
| 2-Mercaptobenzo-thiazole | — | 0.3 | — |
| Diethylene Glycol | — | 2.0 | — |
| Polyethylene glycol (PEG-#4000) | 3.5 | — | — |
| Accelerator (mix-2) | — | 1.3 | — |
| Butylated Hydroxy Toluene (BHT) | 2.0 | — | — |
| Polysulfidic Silane (SI-69)[H] | 3.0 | — | — |
| Titanium Dioxide (Anatase) | 15.0 | — | — |
| Blue Coloring Agent (U/Blue)[I] | 0.15 | — | — |
| Total | 185.58 | 166.2 | 190.9 |
| MCS S.G. | 1.18–1.20 | 1.13–1.15 | 1.12–1.14 |
| Shore A | 57–63 | 57–63 | 62–68 |

[A]Strucktol WB-212, available from Strucktol, Stow, Ohio.
[B]Tetramethyl thiuram disulfide
[C]2,2'-benzothiazyl disulfide
[D]Polymerized 1,2-dihydro-2,2,4-trimethylaminoline available as Flectol H from Hartwick, Akron, Ohio.
[E]Aliphatic-naphthenic-aromatic resin available as Strucktol 60 NS from Strucktol, Stow, Ohio.
[F]Available from Sovereign Chemical Co., Cuyahoga Fall, Ohio.
[G]Available from Degussa, Ridgefield Park, N.J.
[H]Available from Strucktol, Stow, Ohio.
[I]Available from Akrochem, Akron, Ohio.

TABLE 4

| SAMPLE | PARTICLE SIZE[A] | AMOUNT RECYCLED |
|---|---|---|
| C3A-50 | >500 μm | 10 wt % |
| C3A-100 | >500 μm | 20 wt % |
| C3B-50 | ≦500 μm | 10 wt % |
| C3B-100 | ≦500 μm | 20 wt % |
| C4A-50 | >500 μm | 10 wt % |
| C4A-100 | >500 μm | 20 wt % |
| C4B-50 | ≦500 μm | 10 wt % |
| C4B-100 | ≦500 μm | 20 wt % |
| C5A-50 | >500 μm | 10 wt % |
| C5A-100 | >500 μm | 20 wt % |
| C5B-50 | ≦500 μm | 10 wt % |
| C5B-100 | ≦500 μm | 20 wt % |

[A]A 35 mesh = 500 μm. The particle size ≦ 500 μm includes those that passed through a 35 mesh series but were held by a 40 mesh screen (420 μm openings). The particle size >500 μm includes those that passed through a 20 mesh screen (841 μm screen openings) but were held by a 35 mesh screen.

These materials were subjected to the same tests as C0 and C1 in Example 2, and the results are listed in Tables 5 (White), 6 (Red) and 7 (Black). For comparison purposes, the controls also are listed as "STD".

TABLE 5

| | WHITE | | | | |
|---|---|---|---|---|---|
| TEST | C3 STD | C3A-50 | C3A-100 | C3B-50 | C3B-100 |
| Hardness (Shore A) | 57–63 | 66 | 68 | 65 | 65 |
| 300% Modulus* | 35 | 67 | 57 | 63 | 65 |
| Tensile Strength* | 110 | 117 | 116 | 105 | 119 |
| Elongation* | 450 | 478 | 528 | 458 | 505 |
| Tear Resistance* | 35 | 47 | 49 | 42 | 42 |
| Specific Gravity | 1.18–1.20 | 1.17 | 1.17 | 1.17 | 1.17 |
| Abrasion Resistance (cc loss) | 0.60 | 0.53 | 0.59 | 0.50 | 0.59 |

*For other than "STD" values, represents values which were averaged over 3 trials.

TABLE 6

| | RED | | | | |
|---|---|---|---|---|---|
| TEST | C4 STD | C4A-50 | C4A-100 | C4B-50 | C4B-100 |
| Hardness | 57–63 | 72 | 72 | 71 | 72 |

TABLE 6-continued

| | RED | | | | |
|---|---|---|---|---|---|
| TEST | C4 STD | C4A-50 | C4A-100 | C4B-50 | C4B-100 |
| Shore (A) | | | | | |
| 300% Modulus* | 35 | 132 | 122 | 124 | 112 |
| Tensile Strength* | 110 | 225 | 206 | 191 | 188 |
| Elongation* | 450 | 450 | 450 | 417 | 440 |
| Tear Resistance* | 35 | 70 | 69 | 66 | 61 |
| Specific Gravity | 1.13–1.15 | 1.22 | 1.22 | 1.22 | 1.22 |
| Abrasion Resistance (cc loss) | 0.50 | 0.19 | 0.21 | 0.18 | 0.21 |

*For other than "STD" values, represents values which were averaged over 3 trials.

TABLE 7

| | BLACK | | | | |
|---|---|---|---|---|---|
| TEST | C5 STD | C5A-50 | C5A-100 | C5B-50 | C5B-100 |
| Hardness (Shore A) | 62–68 | 63 | 65 | 62 | 64 |
| 300% Modulus* | 35 | 67 | 66 | 73 | 60 |
| Tensile Strength* | 110 | 154 | 142 | 147 | 128 |
| Elongation* | 450 | 543 | 527 | 498 | 503 |
| Tear Resistance* | 35 | 49 | 49 | 48 | 47 |
| Specific Gravity | 1.12–1.14 | 1.15 | 1.15 | 1.14 | 1.15 |
| Abrasion Resistance (cc loss) | 0.50 | 0.11 | 0.11 | 0.11 | 0.10 |

*For other than "STD" values, represents values which were averaged over 3 trials.

As can be seen from the table, the red rubber material, i.e., C4 exhibited poor modulus, tensile strength and elongation, but superior tear resistance and abrasion resistance. As general trends, it can be seen that an increase in the amount of homogeneous mix of recycled material decreased the 300% modulus, had little or no effect on tear resistance and specific gravity, increased elongation and decreased abrasion resistance, i.e., values in Tables 5–7 were higher. The larger particle size of homogeneous recycled material added resulted in a general increase in hardness, little or no effect on specific gravity and abrasion resistance, and increased tensile strength, elongation and tear resistance. As a means for comparison, it can be seen that addition of recycled material to both the white and black solid rubber materials did not substantially adversely affect the physical properties of the solid robber material, and in some cases, improved its properties.

While the invention has been described in detail with respect to particularly preferred embodiments, the foregoing embodiments are intended to illustrate and not to limit the scope of the invention. Skilled practitioners appreciate that various modifications can be made in the invention without departing from the spirit and scope thereof.

What is claimed is:

1. A composition useful for athletic shoe midsoles and outsoles, said composition comprising:
    (a) a material selected from the group consisting of (i) crosslinked or millable polyurethane and (ii) natural or synthetic rubbers; and
    (b) about 10–25 wt % of a homogeneous additive made from recycled shoe materials, said additive exhibiting an average particle size within the range from about 450 $\mu$m to about 550 $\mu$m with a deviation of less than about 20% from the average particle size and made of a mixture comprising:
        65–80 wt % natural or synthetic rubber,
        2–5 wt % polyurethane foam,
        1–2.5 wt % natural or synthetic leather, and
        10–15 wt % of fibrous material.

2. A composition as in claim 1 wherein the size of individual particles in said homogeneous additive does not deviate from the average particle size by more than 15 %.

3. A composition as in claim 1 wherein said homogeneous additive is made from a mixture further comprising:
    5–15 wt % synthetic fibers,
    0–2 wt % millable polyurethane,
    0–0.5 % thermoplastics, and
    0–1% cotton.

4. An athletic shoe sole made from a composition comprising:
    (a) a material selected from the group consisting of (i) crosslinked or millable polyurethane and (ii) natural or synthetic rubbers; and
    (b) about 10–25 wt % of a homogeneous additive made from recycled shoe materials, said additive exhibiting an average particle size within the range from about 450 $\mu$m to about 550 $\mu$m with a deviation of less than about 20% from the average particle size and made of a mixture comprising:
        65–80 wt % natural or synthetic rubber,
        2–5 wt % polyurethane foam,
        1–2.5 wt % natural or synthetic leather, and
        10–15 wt % of fibrous material.

5. The shoe sole of claim 4 wherein said sole is a midsole.

6. A method for making athletic shoe midsoles and outsoles by a process comprising:
    (a) finely dividing a composition comprising 65–80 wt % natural or synthetic rubber, 2–5 wt % polyurethane foam, 1–2.5 wt % natural or synthetic leather, and 10–15 wt % of fibrous material to form a homogeneously sized recycle additive exhibiting an average particle size of within the range from about 450 $\mu$m to about 550 $\mu$m and a deviation of less than about 20% from the average particle size;
    (b) forming a sole material by mixing about 10–25 wt % of said recycle additive with a material selected from the group consisting of (i) crosslinked or millable polyurethane and (ii) natural or synthetic rubbers; and
    (c) shaping said sole material into a shoe sole.

7. The method of claim 6 wherein the shaping step comprises:
    shaping said sole material into a shoe outsole.

* * * * *